(12) United States Patent
Shrekenhamer et al.

(10) Patent No.: US 12,473,101 B2
(45) Date of Patent: Nov. 18, 2025

(54) SPACE-BASED IMAGING DEVICE AND METHOD OF MANUFACTURE THEREOF

(71) Applicant: The Johns Hopkins University, Baltimore, MD (US)

(72) Inventors: David B. Shrekenhamer, Bethesda, MD (US); Joseph A. Miragliotta, Ellicott City, MD (US); Juliana T. Vievering, Columbia, MD (US); Angelos Vourlidas, Alexandria, VA (US); Joseph L. Centurelli, Baltimore, MD (US); Chad N. Weiler, Columbia, MD (US); Nora C. Lane, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 177 days.

(21) Appl. No.: 18/220,621

(22) Filed: Jul. 11, 2023

(65) Prior Publication Data

US 2024/0010365 A1 Jan. 11, 2024

Related U.S. Application Data

(60) Provisional application No. 63/359,909, filed on Jul. 11, 2022.

(51) Int. Cl.
  *G01J 1/04* (2006.01)
  *B64G 1/66* (2006.01)
  (Continued)

(52) U.S. Cl.
  CPC .............. *B64G 1/66* (2013.01); *G01J 1/0223* (2013.01); *G01J 1/0266* (2013.01);
  (Continued)

(58) Field of Classification Search
  None
  See application file for complete search history.

(56) References Cited

U.S. PATENT DOCUMENTS

| | | | |
|---|---|---|---|
| 2017/0025753 A1* | 1/2017 | Driscoll | G02F 1/31 |
| 2023/0130993 A1* | 4/2023 | Finkelstein | G02B 26/101 |
| | | | 356/4.01 |

OTHER PUBLICATIONS

Ye (Mao Ye, Yueheng Peng, and Ya Sha Yi, "Silicon-rich silicon nitride thin films for subwavelength grating metalens," Opt. Mater. Express 9, 1200-1207 (2019)) (Year: 2019).*

(Continued)

*Primary Examiner* — Kara E. Geisel
*Assistant Examiner* — Chad Andrew Reverman
(74) *Attorney, Agent, or Firm* — Noah J. Hayward

(57) ABSTRACT

A device for imaging light, or a source of the light, includes a window for receiving incident light from the source, at least one metasurface, and at least one wedge prism. The metasurface and the wedge prism form a Risley pair and are displaced independently of each other. Each of the metasurface and the wedge prism are operative to deflect the incident light at an angle that is different from an angle of light incident upon them. Each metasurface includes a plurality of sub-wavelength structures that are operative to interact with the incident light received from the window. The device also includes a lens system that is operative to transmit the incident light received from the at least one metasurface and the at least one wedge prism and focuses it on a focal plane.

17 Claims, 4 Drawing Sheets

(51) Int. Cl.
*G01J 1/02* (2006.01)
*G02B 1/00* (2006.01)

(52) U.S. Cl.
CPC .......... *G01J 1/0411* (2013.01); *G01J 1/0477* (2013.01); *G02B 1/002* (2013.01)

(56) References Cited

OTHER PUBLICATIONS

John Dixon et al., "Risley prism universal pointing system (RPUPS)," Proc. of SPIE vol. 9579 (2015), pp. B-1-B-6.

Jean Lacoursiere et al., "Large-deviation achromatic Risley prisms pointing systems," Proc. of SPIE vol. 4773 (2002), pp. 123-131.

Valerie Lavigne et al., "Fast Risley prisms camera steering system: calibration and image distortions correction through the use of a three-dimensional refraction model," Optical Engineering 46(4), 043201, (2007), pp. 1-10.

J. S. Newmark et al., "The Coronal Diagnostic Experiment (CODEX)," Abstract, American Geophysical Union, Fall Meeting 2020, abstract #SH028-0011 (2020), p. 1.

R. A.. Howard et al., Sun Earth Connection Coronal and Heliospheric Investigation (SECCHI), Space Sci Rev 136 (2008), pp. 67-115.

Angelos Vourlidas et al., The Wide-Field Imager for Solar Probe Plus (WISPR), Space Sci Rev 204 (2016), pp. 83-130.

R. A. Howard et al., "The Solar Orbiter Heliospheric Imager (SoloHI)," A&A 642, A13 (2020), pp. 1-23.

Nanfang Wu et al., "Light Propagation with Phase Discontinuities: Generalized Laws of Reflection and Refraction," Science, vol. 334(6054) (2011), pp. 333-337.

Andrew Mcclung et al., "At-will chromatic dispersion by prescribing light trajectories with cascaded metasurfaces," Light: Science & Applications 9:93 (2020), pp. 1-9.

\* cited by examiner

SPACE-BASED IMAGING DEVICE AND METHOD OF MANUFACTURE THEREOF

CROSS-REFERENCE TO RELATED APPLICATIONS

This application claims priority to and the benefit of prior-filed, U.S. Provisional Application No. 63/359,909 filed on Jul. 11, 2022 the entire content of which is hereby incorporated herein by reference.

BACKGROUND

Disclosed herein is an imaging device and a method of manufacture thereof. In particular, disclosed herein is a space-based imaging device with at least one achromatic metasurface and a method of manufacture thereof.

White light observations of solar corona are useful for understanding large-scale coronal structures and examining the evolution of solar transients, such as coronal mass ejections (CMEs), which have consequential space weather impacts. Rather than the more commonly known weather within our atmosphere (like rain, snow, sleet, and wind), space weather can come in the form of solar radiation storms and geomagnetic storms caused by disturbances from the sun. For example, strong solar storms can cause fluctuations of electrical currents in space, directly impacting the power grid on earth and energizing electrons and protons trapped in Earth's varying magnetic field. These disturbances can cause problems with radio communications, global navigation satellite systems, such as global positioning systems (GPS), power grids, and satellites. As the human population becomes more dependent on technology, the desire for space weather monitoring and forecasting becomes more necessary.

Earth-based imagers continue to provide measurements of solar corona but are limited by terrestrial features such as clouds, aircraft, moonlight, small variations in dust and moisture content of the air column, and even high altitude airglow and aurora, which can obscure the desired signal. Space-based heliospheric imagers and coronagraphs are therefore preferable for space weather monitoring and forecasting because of the aforementioned interference provided by the earth's atmosphere and contents.

Gimbals can be used for imagers in order to adjust the instantaneous field of view (FOV) without having to repoint the spacecraft. Gimbals include a ring or base on an axis, that permit an object, as a ship's compass, mounted in or on it to tilt freely in any direction, in effect suspending the object so that it will remain horizontal even when its support is tipped. The FOV is the extent of the observable world that is seen at any given moment. In the case of optical instruments or sensors it is a solid angle through which a detector is sensitive to electromagnetic radiation. With existing optical designs, scanning the corona with a small instantaneous FOV that has fine spatial resolution and/or accommodating a telescope on a spinning or non-sun-pointed spacecraft entails the use of large/complex gimbaled systems. To avoid these complex systems, conventional imagers are designed with a wide FOV, but this involves sacrificing spatial resolution and throughput for coverage.

It is therefore desirable to have an imaging device that circumvents the aforementioned problems (such as, for example, the necessity of large gimbals), while at the same time offering a wide FOV with improved resolution and sensitivity.

BRIEF SUMMARY

A device for imaging light, or a source of the light, includes a window for receiving incident light from the source, at least one metasurface, and at least one wedge prism. The metasurface and the wedge prism form a Risley pair and are displaced independently of each other. Each of the metasurface and the wedge prism are operative to deflect the incident light at an angle that is different from an angle of light incident upon them. Each metasurface includes a plurality of sub-wavelength structures that are operative to interact with the incident light received from the window. The device also includes a lens system that is operative to transmit the incident light received from the at least one metasurface and the at least one wedge prism and focuses it on a focal plane.

A device for imaging light, or a source of the light, includes a window for receiving incident light from the source, and at least two metasurfaces that act as a Risley pair. Each metasurface is displaced independently of the other and each is operative to deflect the incident light at an angle that is different from an angle of light incident upon them. Each metasurface includes a plurality of sub-wavelength structures that are operative to interact with the incident light received from the window. The device also includes a lens system that is operative to transmit the incident light received from the at least two metasurfaces and focus it on a focal plane.

A method of manufacturing a device for examining light, or a source of the light, includes disposing an entry window and a focal plane at opposing ends of a tubular enclosure. The entry window is operative to receive incident light from the light source. The method further includes disposing a plurality of metasurfaces and/or wedge prisms between the entry window and the focal plane, where the plurality of metasurfaces each contain a plurality of sub-wavelength structures that are operative to interact with the incident light received from the window. The method also includes contacting each of the plurality of metasurfaces and/or wedge prisms with a displacement stage that is operative to rotate at least one metasurface of the plurality of metasurfaces with respect to another metasurface, and disposing a system of lenses between the plurality of metasurfaces and/or wedge prisms and the focal plane. The system of lenses is operative to focus the incident light received from the plurality of metasurfaces on the focal plane.

BRIEF DESCRIPTION OF THE DRAWINGS

Figure 1A:
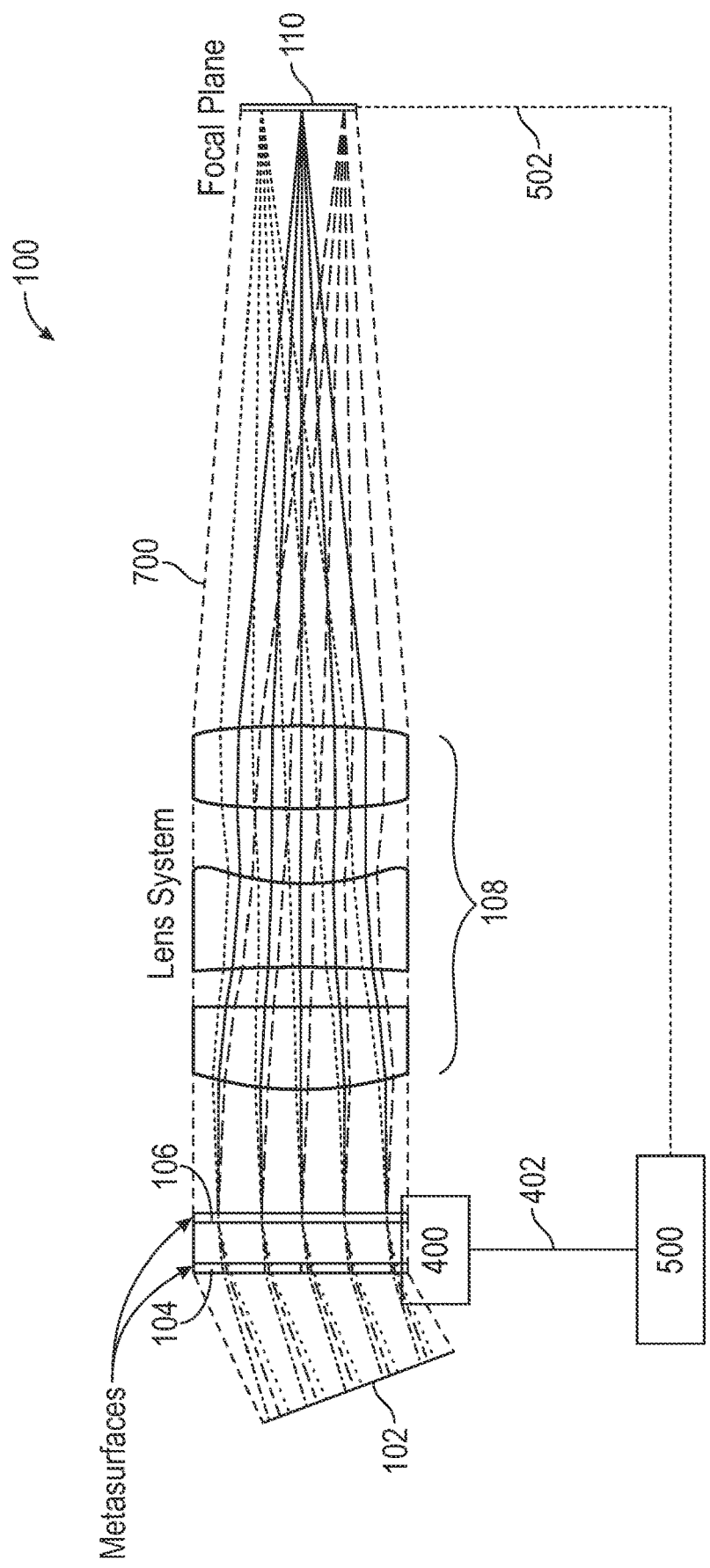
Figure 1B:
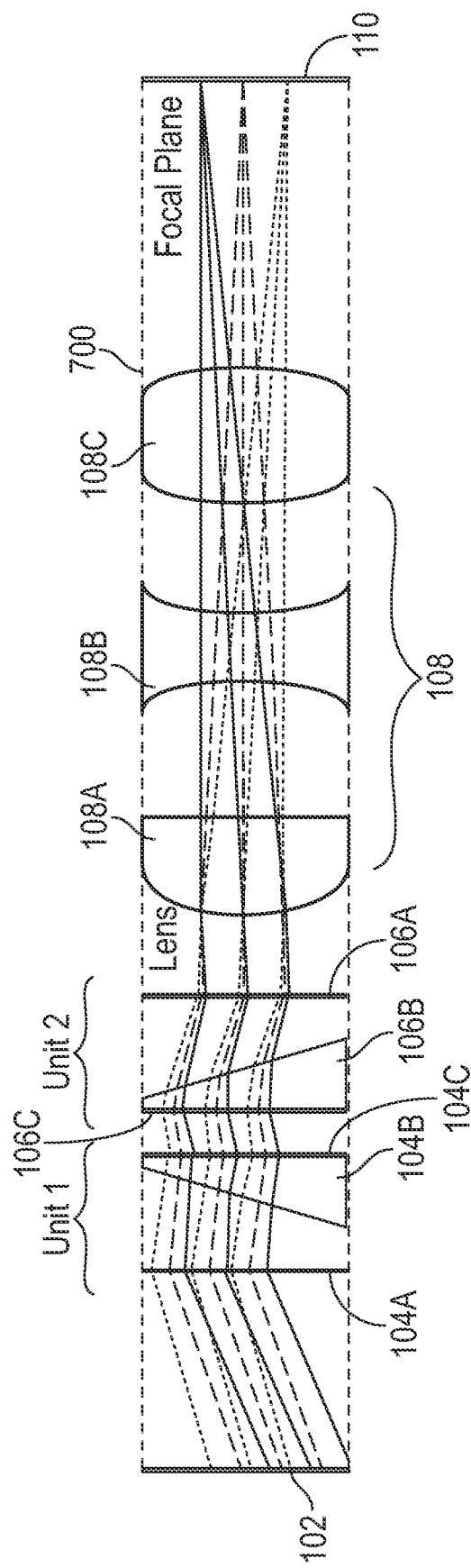
Figure 2C:
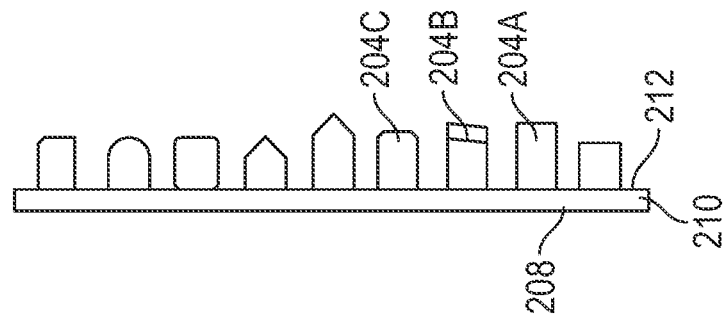
Figure 2B:
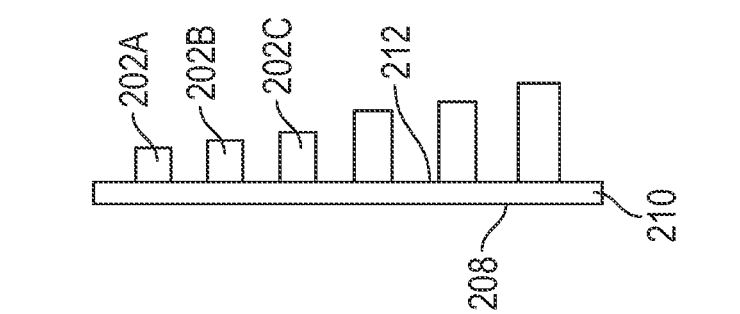
Figure 2A:
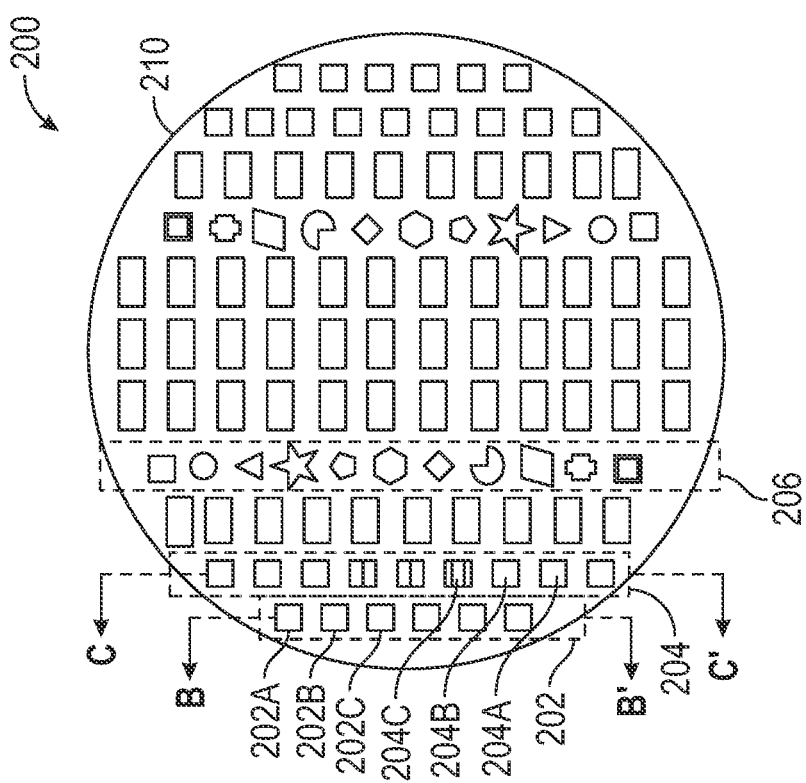
Figure 3:
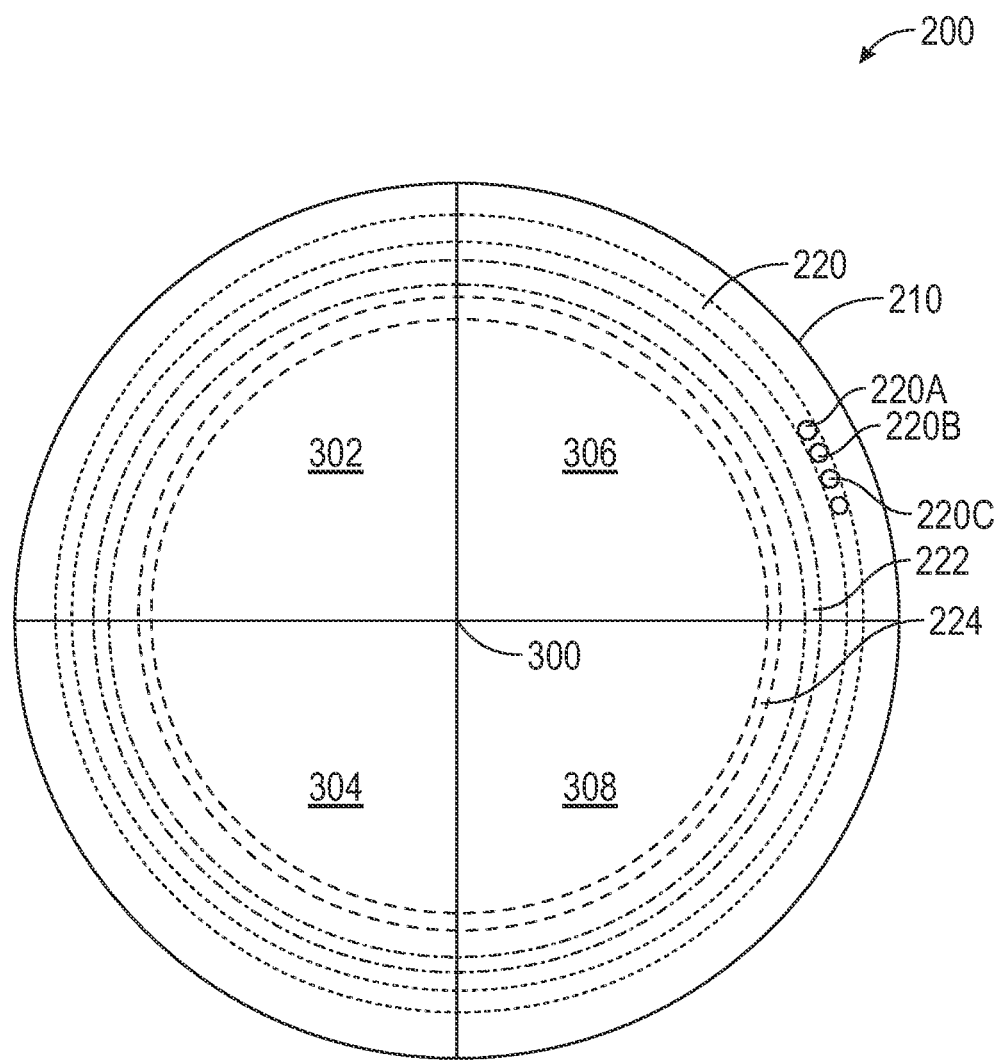

Having thus described some non-limiting, example embodiments in general terms, reference will now be made to the accompanying drawings, which are not necessarily drawn to scale, and wherein:

FIG. 1A is a depiction of an example embodiment of a device including metasurfaces;

FIG. 1B is a depiction of an example embodiment of another device including metasurfaces and wedge prisms;

FIG. 2A is a depiction of a top view of an example embodiment of a metasurface;

FIG. 2B is a depiction of a side view of a section taken along line BB' of the example embodiment of the metasurface shown in FIG. 2A FIG. 2C is a depiction of a side view of a section taken along line CC' of the example embodiment of the metasurface shown in FIG. 2A; and FIG. 3 is a depiction of another example embodiment of a metasurface.

DETAILED DESCRIPTION

Disclosed herein are non-limiting, example embodiments of a compact imaging device (hereinafter device) that includes one or more achromatic metasurfaces and one or more wedge prisms in conjunction with a rotational system that can rotate or translate the metasurface with respect to the wedge prism to obtain a high-resolution, wide-field of view (FOV) image or map of a light emitting source or body. In one example embodiment, the device includes two or more metasurfaces in optical communication with one another, and which can be rotated with respect to each other to create the high-resolution image of the light emitting body. In another example embodiment, the device includes two or more metasurfaces and two or more wedge prisms, where any one of the metasurfaces or prisms can be rotated with respect to others to obtain the high-resolution image of the light emitting body.

A pair of metasurfaces in optical communication with one another or, alternatively, a metasurface in optical communication with a wedge prism, function in much the same manner as a Risley prism pair, in that they can be used for beam steering. In this case, rotating one metasurface in relation to the other or alternatively, rotating one metasurface in relation to the wedge prism will change the direction of the beam. The combination of two metasurfaces that produce beam steering or the combination of a metasurface with a wedge prism that produce beam steering are hereinafter referred to as a "Risley pair".

In an embodiment, when a metasurface is combined with a wedge prism to form a Risley pair, two or more such Risley pairs may be rotated as separate units with respect to each other to promote beam steering. In another embodiment, when the device contains more than two metasurfaces, each pair of metasurfaces may be used as a Risley pair. For example, if a device contains 10 metasurfaces, then each pair of metasurfaces may function as a single unit (i.e., as a single Risley pair) and each of the 5 Risley pairs in the device may be rotated separately and independently with respect to any of the other 4 Risley pairs.

A metasurface is a flat two-dimensional surface that deflects a light beam incident upon it by a predetermined amount that is dependent upon the material and its structure. The metasurface is defined as the periodic (or aperiodic) structures where the thickness and periodicity of the individual elements (scatterers) are small in comparison to the wavelength of operation. The metasurface is a symmetric or asymmetric array of sub-wavelength resonant scatterers that control the electromagnetic response of the surface. Each metasurface deflects light incident upon it at a first plurality of angles by a second plurality of angles. Rotating one metasurface in relation to the other (or rotating a metasurface in relation to a wedge prism that is in optical communication with it) will change the direction of the beam. By rotating each metasurface or wedge prism in the device with respect to each other, the light beam incident upon the device may undergo a deflection at each surface (of the metasurface or prism) till a high resolution image that is free of chromatic aberrations is formed on a focal plane. The respective metasurfaces (or the metasurface and the wedge prism) may also be moved closer or further from each other (and from the source) to vary the image formed on the focal plane. In other words, each metasurface or wedge prism may be rotated with respect to the other to deflect the light incident upon it to change the instantaneous field of view.

The metasurface is a textured film (also termed a substrate) that has sub-wavelength structures disposed on its surfaces. Each feature is of a size and composition that provides both light concentration and tailorable electromagnetic properties. This design concept permits a reduction in the chromatic dispersion typical of conventional periodic gratings by using an aperiodic arrangement of meta unit-cells to form an achromatic surface. In one embodiment, the metasurfaces provide a phase front correction for the entire light beam incident upon it, i.e., the response from the entire metasurface may be collimated. In another embodiment, the metasurface may have different sectors, which can provide different corrections or deflections for light of different wavelengths. In other words, the different sectors may include materials or structures that respond to light of certain wavelengths, while not affecting light of other wavelengths.

The device is steerable and can be reoriented to examine light from any source. In other words, it can be mounted on a structure (e.g., a building, a moving vehicle such as, for example, a spacecraft or a sea-going vessel) and can be oriented as desired to examine different sources of light. This includes terrestrial light sources, extra-terrestrial light sources (e.g., heavenly bodies) and so on. In an embodiment, the device is steerable (i.e., the device can be rapidly reoriented) and may optionally be mounted on an article operating in outer space. In an embodiment, the device can be a heliospheric device—i.e., it can operate in a region in space influenced by the sun or solar wind.

Each metasurface in the device includes a plurality of periodic or aperiodic subwavelength metallic/dielectric structures that resonantly couple to the electric and magnetic fields of incident electromagnetic waves. In an embodiment, each metasurface in the device can include a library of periodic or aperiodic such structures that resonantly couple to the electric and magnetic fields of incident electromagnetic waves to create high-resolution, wide-field of view (FOV) maps of any light emitting body. The metasurface functions in the same manner as a wedge prism. Wedge prisms are typically prisms with a shallow angle (usually 3 degrees or less) between its input and output surfaces. Refraction at the surfaces causes the wedge prism to deflect light by a fixed angle. Rotating one wedge in relation to another will change the direction of the beam. When the wedges are angled in the same direction, the angle of the refracted beam becomes greater. When the wedges are rotated to be angled in opposite directions, they cancel each other out, and the beam is allowed to pass straight through. Moving a wedge either closer or farther away from the laser can also be used to steer the beam.

By permitting the electromagnetic waves to interact with the structures on the one or more metasurfaces and with the one or more wedge prisms (that are in optical communication with each other), chromatic aberrations and field distortions can be minimized. More specifically, by permitting a beam of light from a source to be transmitted through a first metasurface and then through a second metasurface, a high fidelity image of the source of light can be quickly obtained. The metasurfaces can be rotated with respect to each other, moved linearly with respect to each other (towards or away from each other) or both rotated and moved linearly with respect to each other to create high-resolution, wide-field of view maps of a light emitting body with minimal chromatic aberration. The use of metasurfaces in the imaging device provides a significant reduction in size, weight, and power (SWaP) while maintaining the optical performance across large spectral bandwidths and larger angular fields-of-view.

FIG. 1A depicts an exemplary device 100 that includes an entry window 102 for light, a pair of metasurfaces 104 and 106 displaced with respect to each other, a lens system 108 and a focal plane 110. The pair of metasurfaces 104 and 106 function as a "Risley pair". As noted above, the "Risley pair" functions in much the same manner as a "Risley prism pair." The entry window 102, the pair of metasurfaces 104 and 106 and the lens system are in optical communication with one another, with the metasurfaces 104 and 106 being located downstream of the window 102. The metasurfaces 104 and 106 can be displaced with respect to each other to change the field of view of the device 100. The metasurfaces 104 and 106 are displaced via a displacement stage 400 that mechanically moves the metasurfaces with respect to each other. The displacement stage is in operative communication via line 402 with a microprocessor 500. The microprocessor 500 is also in operative communication with a lens system 108 and a focal plane 110 via line 502. In an embodiment, the microprocessor is in electrical, optical or pneumatic communication with the displacement stage 400, the lens system 108 and the focal plane 110.

The lens system 108 is located downstream of the metasurfaces 104 and 106. The lens system 108 serves to focus electromagnetic radiation received from the metasurfaces 104 and 106 onto the focal plane 110. The microprocessor 500 can move the lens system 108 towards or away from the metasurfaces 104 and 106 and can also move the focal plane 110 to obtain an image that is free of distortion or aberrations.

The entry window 102 permits light from a source located in space such as a star, a planet, a comet, and so on to enter the device 100. In an embodiment, the entry window 102 can be oriented using a mechanism (not shown) to focus light onto a relevant portion of the respective metasurfaces 104 and 106 so that the light can be quickly focused on the focal plane 110 while at the same time removing aberrations and distortions. The window may be selected to permit light of selected wavelengths to enter the device 100. In an embodiment, the entry window 102 may optionally include a wavelength filter (not shown) that permits wavelengths in the ultraviolet region, visible region, the infrared region, the near infrared region and/or the far infrared region of the electromagnetic spectrum to enter the device 100. In an embodiment, the entry window may optionally include a wavelength filter that permits wavelengths having frequencies of $10^{10}$ to $10^{16}$ hertz (Hz).

The light entering the device 100 impinges on the first metasurface 104 where it undergoes deflection by a first angle. It is then received by the second metasurface 106 (where it undergoes deflection by a second angle) and is transmitted onto the lens system 108. While FIG. 1A depicts two metasurfaces 104 and 106, there can be three or more, four or more metasurfaces in the device 100. It is also understood, that at least one of the metasurfaces 104, 106 in device 100 may be replaced by a wedge prism. For example, metasurface 106 can be a wedge prism. The metasurface and the wedge prism function as a Risley pair. In an embodiment, the device 100 can include "n" metasurfaces, each aligned with one another to receive a beam of incident light, where n is an integer number greater than 2. In an embodiment, n can be greater than 3, greater than 5, greater than 7, greater than 10. In an embodiment, n is preferably an even number. When a device 100 includes n metasurfaces, the light entering the device 100 impinges on the first metasurface 104 (and interacts with the structures on it) from where it is transmitted to the second metasurface 106 (and interacts with the structures on it) and so on, until it interacts with the $n^{th}$ metasurface (not shown) before being focused on to the focal plane 110 by the lens system 108. It is to be noted that when some metasurfaces are replaced by wedge prisms in the device 100, at least one the metasurfaces will not be a wedge prism.

While a device encompassed by the present disclosure can have "n" metasurfaces, for brevity the present device 100 will be further detailed using only the two exemplary metasurfaces 104 and 106 depicted in FIG. 1A.

Each of the metasurfaces 104 and 106 are housed in a separate stage (not shown) that permits the respective metasurfaces to be displaced with respect to one another but independently of one other. In an embodiment, the displacement by the separate stages can involve rotary motion, linear motion or a combination of both rotary and linear motion of the first metasurface 104 with respect to the second metasurface 106. In an example embodiment, the separate stages are used to promote rotary motion of the first metasurface 104 with respect to the second metasurface 106. The instantaneous field of view (as viewed by the image on the focal plane 110) changes as the two metasurfaces 104 and 106 are displaced (e.g., rotated) relative to each other thus permitting the capture of an image of a light source with minimal distortion and aberrations.

As noted above, each metasurface 104 and 106 include a plurality of periodic or aperiodic subwavelength metallic/dielectric structures that resonantly couple, diffract or refract the electric and magnetic fields of incident electromagnetic waves. Each metasurface 104 and 106 includes a library of different metallic/dielectric structures that can resonantly couple with the incident electromagnetic waves. The metasurface is a 2D planar structure composed of structures with electromagnetic properties in a certain arrangement, which can achieve flexible modulation of the amplitude, phase, and polarization of the incident light. It deflects light incident upon it at a first angle through a second angle. Each structure on each metasurface thus has an ability to manipulate the optical field for a beam of incident light.

FIG. 1B is another depiction of an exemplary device 100 that includes two units, each of which includes two or more metasurfaces with one or more wedge prisms disposed therebetween. Each of these units can be rotated with respect to the other to facilitate beam steering. Specifically, Unit 1 includes metasurfaces 104A and 104C between which is disposed a wedge prism 104B, while Unit 2 includes metasurfaces 106A and 106C between which is disposed a wedge prism 106B. In an embodiment, at least one surface of the metasurface can directly contact a surface of wedge prism. In another embodiment, the wedge prism's location between the metasurfaces of the unit can be varied to be closer or further from one metasurface relative to another. For example, a surface of metasurface 104C can contact a surface of wedge prism 104B. The wedge prism 104B can also be moved linearly towards or away from each of the metasurfaces 104A and 104C. In a similar manner, wedge prism 106B can contact one of the metasurfaces or can be located at any position between metasurfaces 106A and 106C. In an embodiment, the device may include a plurality of metasurfaces and a plurality of wedge prisms, where each metasurface is paired with one wedge prism to form a plurality of Risley pairs, each of which can be operated as a separate unit and rotated separately and independently with respect to other separate units.

Each of the metasurfaces 104A, 104C, 106A, and 106C and each of the wedge prisms 104B and 106B may be independently moved (rotated with respect to each other or moved nearer or further from each other). In an embodiment, each of the metasurfaces 104A, 104C, 106A, and 106C and each of the wedge prisms 104B and 106B are in contact with a rotary stage (as detailed in FIG. 1A) and can be rotated independently with respect to each other. Any combination of the metasurfaces 104A, 104C, 106A, and 106C and wedge prisms 104B and 106B can be moved together with respect to any other combination to produce beam steering. They can all be rotated in equal or different amounts. In another embodiment, each combination of a metasurface and wedge prism are rotated together simultaneously in any direction. For example, in FIG. 1B, the metasurface 104A and the wedge prism 104B are rotated together as a single unit, while the metasurface 106A and the wedge prism 106B are also rotated together as a single unit to produce beam steering. In another embodiment, each of the units can be rotated together simultaneously. For example, Unit 1 which includes metasurfaces 104A and 104C and wedge 104B can all be rotated together in one direction in an equal amount, while Unit 2 which includes metasurfaces 106A and 106C and wedge 106B can also be rotated together.

As noted above, each of the metasurfaces 104A, 104C, 106A, and 106C and each of the wedge prisms will deflect the light incident upon them by a different angle. By rotating any one of the metasurfaces or wedge prisms or by rotating any combination of metasurfaces and/or wedge prisms in FIG. 1B, a light beam incident upon the device can be focused on the focal plane 110 via lens system 108 to obtain an image of a light source with minimal distortion and aberrations. The other features detailed in FIG. 1A such as the displacement stage 400 that mechanically moves the metasurfaces or prisms with respect to each other, the microprocessor 500 and the communication lines 402 and 502 can be used in the embodiment depicted in FIG. 1B. They are however, not depicted in FIG. 1B. It is to be noted that other optical components such as a bandpass filter, a polarizer, or a combination thereof may optionally be disposed between the window and the metasurfaces or between the plurality of metasurfaces and prisms.

FIG. 2A depicts a top view of an exemplary single layer metasurface 200 that includes a plurality of structures 202A, 202B, 202C, 204A, 204B, 204C, . . . , and so on, that protrude outwards from a base substrate 210 or protrude into the base substrate 210. The metasurface 200 depicted in FIG. 2A represents one of the metasurfaces 104 or 106 depicted in the device 100 of FIG. 1A.

The base substrate 210 has opposing surfaces 212 and 208. In a single layer metasurface 200, the plurality of structures 202A, 202B, 202C, . . . , 204A, 204B, 204C, . . . , and so on, protrude from one of surface 208 or 212. The base substrate 210 may have an outer boundary (a perimeter) that is circular, rectangular, triangular, or polygonal. In an example embodiment, the outer boundary is circular. A circular outer boundary facilitates easy rotary motion of the metasurface when it is mounted on a rotary stage in the device 100. The rotary motion may be transmitted by each stage (not shown) to the circumference of each metasurface, the center of the metasurface or both the center as well as the circumference of the metasurface. The opposing surfaces 208 and 212 of the base substrate 210 may be planar (a flat surface) or a curved.

For ease of explanation, the structures arranged along a particular vertical line will be designated as belonging to a particular column. Thus column 202 contains structures 202A, 202B, 202C, and so on, while column 204 contains structures 204A, 204B, 204C, and so on.

The structures in a particular row or column may be periodically or aperiodically spaced. Each successive structure in any direction on the metasurface will be different from a neighboring structure either in size, geometry, composition, or any combination thereof.

For example, the structures 202A, 202B, 202C, and so on, from column 202 may be seen to have the same geometry but are of a different size from one another. A section taken along BB' illustrating the column 202 is shown in the expanded side view in FIG. 2B. From the expanded side view, it may be seen that each protruding structure is larger than the preceding structure from top to bottom of the column 202. While FIG. 2B depicts each structure from protruding outwards from base substrate 210, it is also plausible for some structures to protrude into the base substrate 210 (termed "inclusions"—not shown here).

As shown in FIG. 2C, which depicts an expanded side view of a section taken along line CC' showing the column 204 of the metasurface 200 shown in FIG. 2A, in the column 204, it may be seen that the structures have a different size and/or geometry from their nearest neighbors. For example, structure 204A has a different shape (geometry) from structure 204B, which has a different geometry from structure 204C. Structure 204D has the same shape as structure 204E but is larger than it.

Along the same lines, and referring again to FIG. 2A, in column 206 it may be seen that each of the structures have different geometries from one another. The cross-sectional area of each protrusion (taken along a plane parallel to the surface 212 (when it is a flat surface)) may therefore be triangular, square, rectangular, circular, ellipsoidal, polygonal, or any combination thereof. The cross-sectional area of each protrusion (taken along a plane parallel to the surface 212 (when it is a flat surface)) may be regular or irregular. The protrusions may be bounded by surfaces that are parallel, perpendicular, or inclined at any angle therebetween to the surface 212 of the base substrate 210.

FIG. 3 depicts another embodiment of a metasurface 200, where the structures (the protrusions or inclusions) are arranged to lie concentrically along imaginary circles 220, 222, 224, and so on. The circles 220, 222, 224 are concentric about a center 300 of the metasurface 200. They may also be concentric about an outer circumference of substrate 210. The metasurface 200 can be rotated about the center 300. Each circle 220 contains a plurality of structures 220A, 220B, 220C, . . . , and so on, each of which are different from one another in size, geometry or composition.

In one embodiment, at least one metasurface includes sectors that have structures segregated by their ability to interact with different wavelengths of incident light. In an embodiment, the metasurface may optionally have 3 or more sectors, preferably 4 or more sectors, where each sector has structures that preferably exclusively interact with light in a certain portion of the electromagnetic spectrum. For example, as depicted in FIG. 3, the metasurface 200 has 4 sectors 302, 304, 306 and 308, where the structures in the first sector 302 can preferentially interact with light having a wavelength of 300 to 500 nanometers, while the structures in the sector quadrant 304 can preferentially interact with light having a wavelength of 501 to 700 nanometers. Structures in the third sector 306 can preferentially interact with light having a wavelength of 701 to 800 nanometers, while structures in the fourth sector 308 can preferentially interact with light having a wavelength of 801 to 1000 nanometers.

This arrangement allows for a quick alignment of the relevant structures in sequential metasurfaces 104, 106, and so on, while light is being examined. For example, if light of a wavelength 300 to 500 nanometers from a source is being examined, the structures in the first quadrant of metasurface 104 can be quickly aligned with the structures in the first quadrant of the metasurface 106 to get an image that is free of aberrations and distortions.

Each of the structures 202A, 202B, 202C, . . . , 204A, 204B, 204C, . . . , 220A, 220B, 220C, and so on, has sub-wavelength outer dimensions with respect to the incident light being examined. In other words, the dimensions (the size) of a structure used to examine light of a particular wavelength are smaller than the wavelength of light itself. For example, if the wavelength being examined is 690 to 700 nanometers, then the outer dimensions of the particular structure being used to examine the light should be less than 690 nanometers.

In an embodiment, each of the protrusions on the metasurface is a nanopost (e.g., a nanocylinder, a nanorod, a nanotube, a nanocube, a nanocolumn, a nanopillar, and the like) having a diameter or diagonal width of 50 nanometers to 1 millimeter (1000 nanometers), preferably 100 nanometers to 0.5 millimeters. The diameter or width is the largest cross-sectional dimension. This size range encompasses electromagnetic wavelengths in the visible and infrared light (near infrared and far infrared light). The nanopost periodicity needs to be sub-wavelength ($<\lambda/2$), and typically scales as a function of wavelength.

Each nanopost has an aspect ratio of 1:1 (ratio of height to width/diameter) to 1000:1, preferably 2:1 to 500:1, and more preferably 3:1 to 20:1. Each metasurface will thus include a plurality of such nanoposts, where each nanopost may have different dimensions from a neighboring nanopost. In an embodiment, several nanoposts on a particular metasurface can have identical dimensions, geometries and compositions as other nanoposts on the metasurface. A metasurface of this type is sometimes referred to as a library. The library is the collection of nanoposts in a particular wavelength range.

A metasurface can include over 50,000 structures (e.g., protrusions, inclusions, nanoposts), preferably greater than 100,000 structures, preferably greater than 500,000 structures, preferably greater than 1,000,000 structures, preferably greater than 1,000,000,000 (1 billion) structures, and more preferably greater than 5,000,000,000 (5 billion) structures.

A metasurface or wedge prism is preferably manufactured from a material that has a refractive index (n) of 1.0 to 5.0, preferably 1.5 to 4.5 and preferably 2.0 to 4.0. In an embodiment, high refractive index (having a refractive index greater than 4), low dielectric loss materials (where the dielectric loss constant is significantly less than 1) are advantageous. Silicon (having a refractive index of about 3) is preferably used in these metasurfaces or prisms.

While metasurfaces may typically be manufactured from a single material, they can also be manufactured from multiple materials using additive manufacturing. The metasurface or prism may be manufactured from polymers, ceramics, metals, or a combination thereof. Advantageous metasurfaces or prism for examining light sources include ceramics.

Polymers having a high refractive index of greater than 1.6, preferably greater than 1.75 and more preferably greater than 1.9 may be used in metasurfaces or prisms. Examples include polymers that contain sulfur, halogens (e.g., fluorine, chlorine, bromine, or a combination thereof), phosphorus, and/or silicon. Polyferrocenylsilanes and polyferrocenes containing phosphorus spacers and phenyl side chains have refractive index values of greater than 1.7. Polymers that contain high refractive index nanoparticles may also be used. High refractive index nanoparticles include $TiO_2$ (anatase, refractive index (n)=2.45; rutile, n=2.70), $ZrO_2$ (n=2.10), amorphous silicon (n=4.23), PbS (n=4.20) and ZnS (n=2.36). By adding effective amounts of these nanoparticles to polymers, the refractive index of the polymer can be raised to about 2.0. Polymers with or without the nanoparticles may be used to analyze light in the visible wavelength regime.

Ceramics are advantageous for use in metasurfaces or prisms for observing and studying light from a variety of different sources. Examples of suitable ceramics are nitrides, arsenides, oxides, tellurides, sulfides, selenides, chalcogenides, or a combination thereof. Amorphous silicon is used in the metasurfaces for wavelengths of 1 to 5 micrometers. Silicon-rich silicon nitride (SiNx) is used to image and analyze light in the 500 to 1 micrometer wavelength region and germanium is used long wave infrared region having wavelengths of 7 to 14 micrometers. Titanium dioxide ($TiO_2$) is used primarily to analyze light in the visible wavelength regime.

Silicon-rich silicon nitride (n=2.5), crystalline silicon (c-Si), hydrogenated amorphous silicon (a-Si:H), titanium dioxide ($TiO_2$), gallium arsenide, germanium, tellurides (e.g., lead telluride (PbTe), $Ge_2Sb_2Se_4Te_1$, $Ge_2Sb_2Te_5$, $Sb_2Te_3$, GeTe, or a combination thereof) and hafnium oxide ($HfO_2$) are suitable for analyzing infrared radiation having wavelengths of 1.4 to 3 micrometers. Other materials include sulfides and selenides. These include materials such as $Sb_2S_3$, $Sb_2Se_3$, or a combination thereof. The sulfides and selenides are useful for analyzing radiation in the near infrared regime (0.7 to 1.3 micrometers).

Silicon-rich silicon nitride (SRN) is advantageous. Silicon-rich silicon nitride, which contains a relatively large portion of silicon, can exhibit higher refractive indices, when compared to regular silicon nitride. In addition, the extinction coefficient of silicon-rich silicon nitride is smaller than that of hydrogenated amorphous silicon, leading to reduced absorption loss in the shorter wavelengths. The silicon-rich silicon nitride structures support the electric dipole (ED) and magnetic dipole (MD) resonances via Mie scattering, thereby leading to appropriate spectral filtering characteristics.

Metasurfaces are typically manufactured using nanoimprint lithography, electron beam lithography, soft lithography, deep-UV (stepper), photolithography and direct write laser lithography, amongst other methods. Nanoimprint lithography (NIL) is a method of fabricating nanometer scale patterns. It creates patterns by mechanical deformation of an imprint resist. The imprint resist is typically a monomer or polymer formulation that is cured by heat or UV light during the imprinting.

Electron-beam lithography (often abbreviated as e-beam lithography, EBL) is the practice of scanning a focused beam of electrons to draw custom shapes on a surface covered with an electron-sensitive film called a resist (exposing). The electron beam changes the solubility of the resist, enabling selective removal of either the exposed or non-exposed regions of the resist by immersing it in a solvent (developing). The purpose, as with photolithography, is to create very small structures in the resist that can subsequently be transferred to the substrate material, often by etching. The primary advantage of electron-beam lithography is that it can draw custom patterns (direct-write) with sub-10 nm resolution.

Soft lithography (SL) is a class of technologies employed to fabricate or reproduce structures utilizing elastomeric stamps, molds and conformable photomasks. Because it uses elastomeric materials, most notably polydimethylsiloxane (PDMS), it is called soft. SL enables the multi-scale patterning on polymers or other substrates of micro/nanoscale patterns. With high-resolution replica molding, any polymer compliant to the PDMS stamping, including non-photolithographic definable polymers, can also be patterned with high resolutions.

In an embodiment, portions of the metasurfaces may be manufactured using additive manufacturing. When additive manufacturing is used, the individual structures (e.g., the substrate, protrusions, inclusions, nanoposts, and the like) may be manufactured from different materials (materials having different chemical compositions). In an embodiment with reference now to FIG. 2, a first portion of the substrate 210 having a first structure 202A mounted on that particular portion of the substrate may be different from a second portion of the substrate 210 and a second structure 202B mounted on that second portion of the substrate. For example, with reference to FIG. 2, the structure 202A may have a different composition from the structures 202B, 202C, and so on. In an embodiment, the additive manufacturing may be conducted in such a manner that each structure on a given metasurface is different in composition from any other structure on the metasurface.

With reference now again to FIGS. 1A and 1B, the metasurfaces 104 and 106 of FIG. 1A (or from metasurfaces 104A and 106A and wedge prisms 104B and 106B shown in FIG. 1B) are rotated with respect to each other to change the field of view and to obtain an image of the light source being imaged without chromatic aberrations. The lens system 108 is designed to focus light received from the metasurfaces and/or the wedge prisms. The lens system 108 focuses light (incident upon it) so that a well resolved image of the light (without any distortions or aberrations) from the source is obtained clearly on the focal plane 110. The lens system 108 can include one or more lenses that facilitate the collection of a well resolved image.

In one embodiment, the microprocessor may be used to facilitate the rotation of the metasurfaces and/or prisms to expand the field of view while at the same time obtaining better image resolution. The instantaneous field of view changes as the two metasurfaces are rotated relative to each other, and the steered beam is focused by the lens system onto the focal plane.

In summary, one method of using the device for imaging sources of light includes steering the device 100 such that incident light from the source enters through the entry window 102. The rotary stage (not shown) upon being instructed by the microprocessor displaces two or more of the plurality of displaceable metasurfaces and/or wedge prisms so that the incident light from the window interacts with the sub-wavelength structures disposed on the metasurfaces. The rotary stage(s) are independent of each other and rotate the metasurfaces and/or wedge prisms with respect to each other. As noted above, the rotary stages are also capable of rotating each metasurface-wedge pair as a single unit. (See FIG. 1B) Each sub-wavelength structure on a metasurface is operative to interact with the incident light received from the window to produce an image that is free of aberrations and distortions. The light after interactions with the metasurfaces and/or wedge prisms is focused by the lens system 108 to form an image on focal plane 110.

With reference once again to FIGS. 1A and 1B, in one method of manufacturing the device 100, a tubular enclosure 700 includes an entry window 102 at a first end and a focal plane 110 at a second end that is opposed to the first end. Disposed between the entry window 102 are the plurality of metasurfaces 104 and 106 (see FIG. 1A) or alternatively, a plurality of metasurfaces 104A and 106A and a plurality of wedge prisms 104B and 106B (see FIG. 1B) that are in communication with the displacement stage 400. Disposed downstream of the plurality of metasurfaces 104 and 106 or the plurality of metasurfaces 104A and 106A and a plurality of wedge prisms 104B and 106B is the lens system 108 that focuses an image of a light source on the focal plane 110. The displacement stage 400, the lens system 108 and the focal plane 110 are in operative communication with the microprocessor 500. The microprocessor contains a database that facilitates in steering the device 100 so that window 102 is oriented to let in incident light from a source. The microprocessor provides information to the displacement stage 400 to rotate the metasurfaces 104 and 106 (or the metasurfaces 104A and 106A and the wedge prisms 104B and 106B) which facilitates changing the field of view and permitting light from the source to be imaged without distortions or aberrations.

The device disclosed herein is advantageous in that it is a more compact system that provides a wide field of view while at the same time providing better image resolution than conventional systems which use only wedge prisms. Compared to conventional gimbal systems, metasurfaces are more compact, resistant to vibration, offer higher scan speeds (4000 rpm), and utilize lower power for operation. Furthermore, since the deflection angle is determined by the geometries of the wedge prisms, these systems significantly increase in mass and cost as they scale to larger apertures and/or larger deflection angles.

While the invention has been shown and described herein with reference to some non-limiting, example embodiments, it will be understood by those skilled in the art that various changes may be made and equivalents may be substituted for elements thereof without departing from the spirit or scope of the invention. In addition, many modifications may be made to adapt a particular situation or material to the teachings of the invention without departing from the spirit or scope thereof. Therefore, the invention should not be limited to the particular example embodiments disclosed as contemplated for carrying out this invention, but that the invention will include all embodiments falling within the scope of the appended claims.

What is claimed is:

1. A device for imaging light, the device comprising:
   a window for receiving incident light from a source;
   a plurality of displaceable metasurfaces;
   a plurality of wedge prisms, wherein
      each metasurface of the plurality of displaceable metasurfaces is paired with one wedge prism of the plurality of wedge prisms to form a Risley pair,
      the plurality of metasurfaces and the plurality of wedge prisms form a plurality of Risley pairs,
      each Risley pair of the plurality of Risley pairs is moved independently of another Risley pair of the plurality of Risley pairs,
      each Risley pair of the plurality of Risley pairs is operative to deflect the incident light at an angle that is different from an angle of light incident upon the Risley pair, and each metasurface comprises a plurality of sub-wavelength structures that are operative to interact with the incident light received from the window; and a lens system that is operative to transmit the incident light received from each Risley pair of the plurality of Risley pairs and to focus the incident light on a focal plane.

2. The device of claim 1, wherein each sub-wavelength structure has dimensions that are smaller than a wavelength of incident light impinging upon it.

3. The device of claim 1, wherein the plurality of displaceable metasurfaces includes at least one metasurface that can be rotated with respect to at least one other metasurface to produce an image on the focal plane that is free of distortions and chromatic aberrations.

4. The device of claim 3, wherein each metasurface of the plurality of displaceable metasurfaces is in rotary communication with a rotary stage that is controlled by a microprocessor.

5. The device of claim 1, wherein each sub-wavelength structure of the plurality of sub-wavelength structures has a different size, shape or composition from another sub-wavelength dielectric structure on at least one metasurface of the plurality of metasurfaces.

6. The device of claim 1, wherein the device is steerable and is mounted on an article operating in outer space.

7. The device of claim 1, wherein the plurality of sub-wavelength structures comprises at least one of silicon-rich silicon nitride, crystalline silicon, amorphous silicon, hydrogenated amorphous silicon, titanium dioxide, gallium arsenide, germanium, lead telluride, $Ge_2Sb_2Se_4Te_1$, $Ge_2Sb_2Te_3$, $Sb_2Te_3$, GeTe, hafnium oxide, $Sb_2S_3$, $Sb_2Se_3$, or a combination thereof.

8. The device of claim 1, wherein the plurality of sub-wavelength structures comprises silicon-rich silicon nitride.

9. The device of claim 1, wherein at least one metasurface comprises sectors that have structures segregated by their ability to interact with different wavelengths of incident light.

10. A device for imaging light, the device comprising:
a window for receiving incident light from a source;
a plurality of displaceable metasurfaces;
a plurality of wedge prisms, wherein each metasurface of the plurality of displaceable metasurfaces is paired with one wedge prism of the plurality of wedge prisms to form a Risley pair, the plurality of metasurfaces and the plurality of wedge prisms form a plurality of Risley pairs, where each Risley pair of the plurality of Risley pairs is displaced independently of the other, and where each Risley pair of the plurality of Risley pairs is operative to deflect the incident light at an angle that is different from an angle of light incident upon the Risley Pair; where each metasurface comprises a plurality of sub-wavelength structures that are operative to interact with the incident light received from the window; and a lens system that is operative to transmit the incident light received from each Risley pair of the plurality of Risley pairs and focus it on a focal plane.

11. The device of claim 10, further comprising a plurality of "n" metasurfaces, where n is an integer greater than 1.

12. The device of claim 10, wherein the plurality of sub-wavelength structures comprise at least one of silicon-rich silicon nitride, crystalline silicon, amorphous silicon, hydrogenated amorphous silicon, titanium dioxide, gallium arsenide, germanium, lead telluride, $Ge_2Sb_2Se_4Te_1$, $Ge_2Sb_2Te_3$, $Sb_2Te_3$, GeTe, hafnium oxide, $Sb_2S_3$, $Sb_2Se_3$, or a combination thereof.

13. The device of claim 10, wherein the interaction with the sub-wavelength structures includes resonance, diffraction or refraction of an electric or magnetic field of the incident light.

14. The device of claim 10, wherein each sub-wavelength structure has dimensions that are smaller than a wavelength of incident light impinging upon it.

15. The device of claim 12, wherein each metasurface of the plurality of displaceable metasurfaces is in rotary communication with a rotary stage that is controlled by a microprocessor.

16. The device of claim 12, wherein each sub-wavelength structure of the plurality of sub-wavelength structures has a different size, shape or composition from another sub-wavelength dielectric structure on at least one metasurface of the plurality of metasurfaces.

17. A method of manufacturing a device for examining light sources, the method comprising:
disposing an entry window and a focal plane at opposing ends of a tubular enclosure; where the entry window is operative to receive incident light from the light source;
disposing a plurality of metasurfaces and/or wedge prisms between the entry window and the focal plane; where the plurality of metasurfaces each contain a plurality of sub-wavelength structures that are operative to interact with the incident light received from the windows, wherein each metasurface of the plurality of metasurfaces is paired with one wedge prism of the plurality of wedge prisms to form a Risley pair, and wherein the plurality of metasurfaces and the plurality of wedge prisms form a plurality of Risley pairs, and each pair of Risley pairs is moved independently of another Risley pair of the plurality of Risley pairs;
contacting each of the plurality of metasurfaces and/er wedge prisms with a displacement stage that is operative to rotate at least one metasurface of the plurality of metasurfaces with respect to another metasurface; and
disposing a system of lenses between the plurality of metasurfaces and/or wedge prisms and the focal plane; where the system of lenses is operative to focus the incident light received from the plurality of metasurfaces on the focal plane.

* * * * *